Aug. 11, 1959 W. B. ELLIOTT 2,899,224
MEANS AND METHOD FOR JOINING PARTS
Filed July 8, 1957 2 Sheets-Sheet 1

WILLIAM B. ELLIOTT
INVENTOR.

BY

ATTORNEY

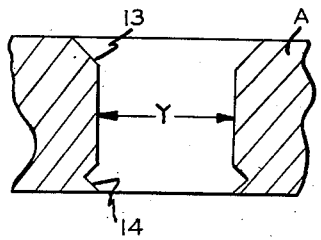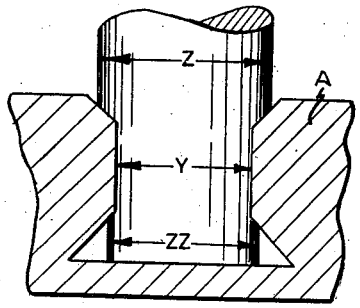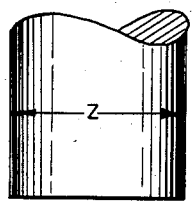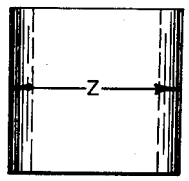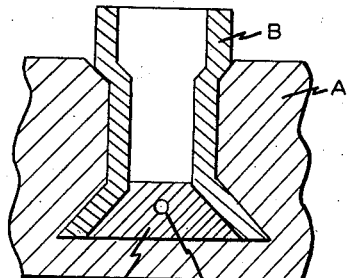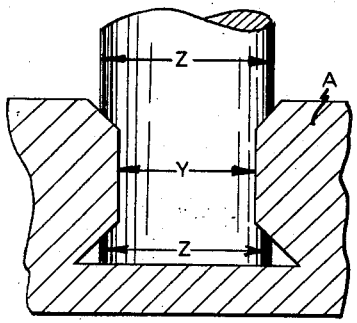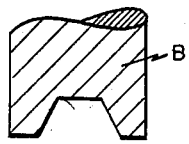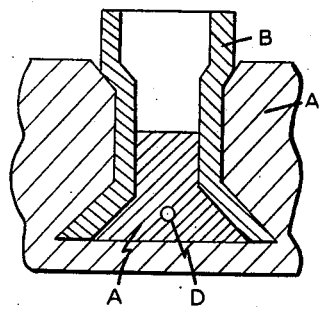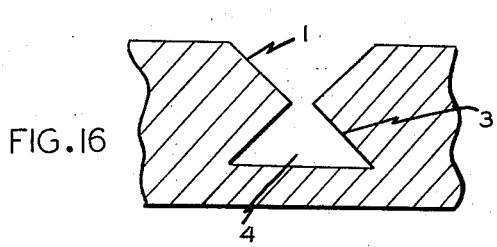

United States Patent Office 2,899,224
Patented Aug. 11, 1959

2,899,224

MEANS AND METHOD FOR JOINING PARTS

William B. Elliott, St. Catharines, Ontario, Canada

Application July 8, 1957, Serial No. 670,544

2 Claims. (Cl. 287—126)

This invention relates to a means and method for joining and holding two parts together, and more specifically to an improved means and method for press fitting two parts together particularly where a blind recess of the female part is necessary or desirable.

It is common in many arts to "press fit" a male and female part together, the parts being held together by the friction between the two parts. This conventional method suffers from several notable disadvantages and it is the principal object of this invention to provide a means and method whereby a male and female part may be press fitted together more firmly, positively and securely than is possible by means of conventional press fitting.

It is another important object of the invention to provide such a means and method as will be particularly adaptable to those applications wherein a blind recess in the female part is necessary or desirable.

These and other advantageous objects will become apparent through a consideration of the following detailed description taken in conjunction with the attached drawings in which:

Figures 1 to 3 inclusive show in vertical cross section progressive stages in the formation of a female recess according to one embodiment of this invention.

Figure 4 shows in vertical cross section a recess constructed in accordance with the concept of the invention.

Figures 5 to 7 inclusive show similar progressive stages in the formation of a female recess according to an alternative embodiment of the invention.

Figure 8 is a vertical cross section of a recess formed according to another embodiment of the invention.

Figures 9 and 10 illustrate possible forms of male member.

Figures 11 and 12 show the male member of Figure 9 fitted into the recesses of Figure 4 or 7.

Figures 13 and 15 show further embodiments of the invention in which the member of Figure 10 is filled into the socket of Figures 4 or 7, and Figure 14 shows an alternative construction of the male members shown in Figures 9 and 10.

Figure 16 shows an alternative embodiment of a recess formed in accordance with features of the invention.

The invention consists broadly in the formation of a female recess having a cross sectional configuration corresponding to that of the male member required to be fitted therein, said recess having at least an intermediate portion with parallel sides, and having an enlarging taper towards the inner extremity of the recess whereby the innermost cross sectional area of the recess is significantly greater than said parallel portion, the dimensions of the parallel portion being such that when the male member is pressed into the recess in one embodiment of the invention, neither the male nor female part is stressed beyond its respective elastic limit, and in another embodiment of the invention either male part or the female part or both are stressed beyond their respective elastic limits.

Figure 1:
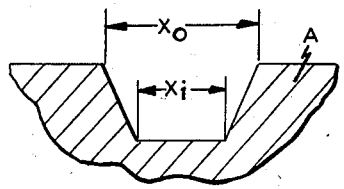

In greater detail, and referring now to the drawings, Figure 1 illustrates a circular blind tapered recess formed in the usual manner in a female element A in which it is desired to press fit a male element B. The recess has an inside diameter of $Xi$ and an outside diameter $Xo$ as shown. According to the method of this invention, it is required to form, from this conventional tapered recess, a recess having the configuration shown in Figure 4, namely an initially inwardly tapered portion 1, a parallel portion 2 representing the minimum cross sectional dimensions of the socket, and an enlarging tapered portion 3 towards the inner extremity of the recess forming a chamber 4 in the interior of the recess.

It is to be understood that the invention lies in the formation of a socket of the general configuration of Figure 4 as hereinafter described in detail, and is not to be construed as limited to any precise method of forming this recess, but the following is a convenient and preferred method by which this recess may be formed from the conventional blind tapered recess of Figure 1, and is given by way of example.

Figure 2:
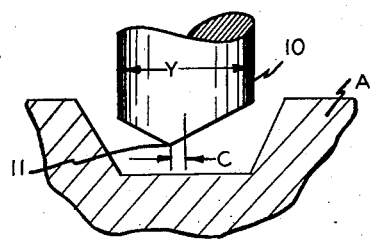

Referring to Figures 1 to 4, the conventional blind tapered recess of Figure 1 may be enlarged to diameter $Y$ by a forming tool or bit 10 having a diameter $Y$, and also having an eccentric point 11. As shown in Figure 2, this tool is eccentric by an amount shown as "C." This tool will enlarge the diameter of the parallel portion recess to $Y$, this dimension being between $Xo$ and $Xi$ for reasons which will become apparent hereafter.

The sides of the enlarged recess will be parallel until the point of the tool 10 strikes the bottom of the initially formed recess. This is the position shown in Figure 2.

Figure 3:
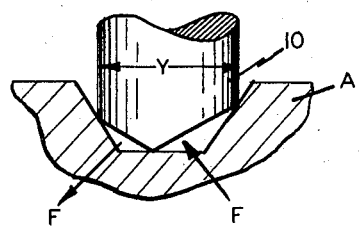

As the tool progresses into part A, pressure is exerted on the point of the tool 10, as shown vectorially by Figure 3, and as the tool progresses beyond the bottom of the initially tapered portion, this pressure will increasingly bend that portion of the tool proceeding below the parallel portion so that an enlarging tapered inner chamber 4 is formed below the parallel portion as may be seen in Figure 1.

Figure 5:
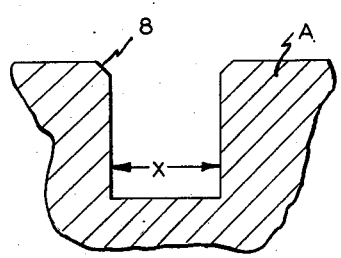
Figure 6:
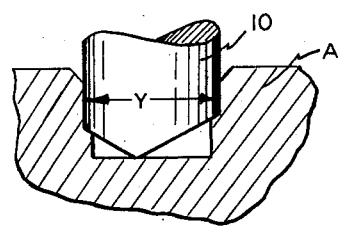

It is the essence of this invention that the recess in the female member have at least an intermediate parallel portion, and an outwardly tapered inner chamber below this parallel portion for reasons which will become apparent hereafter, or at least that the minimum cross sectional dimensions of the recess occur immediately above the inner chamber as hereinafter explained. Figures 1 to 4 show how such a recess may be formed in a conventional tapered recess, and Figures 5 to 7 inclusive show how a similar recess may be formed from the conventional parallel sided recess which may or may not have an outermost flared portion 8 as seen in Figure 5.

Here again, an eccentric tool 10 is used to enlarge the recess (diameter $X$ at the parallel portion) to $Y$, and $Y$ is preferably less than the diameter of the flared portion so that the enlarged recess (see Figure 6) will still have this initial flared portion. Again penetration of the eccentric tool beyond the bottom of the recess of Figure 4 forms an enlarging tapered chamber below the parallel portion.

Figure 7:
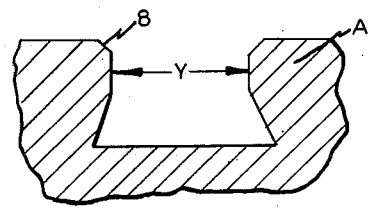
Figure 4:
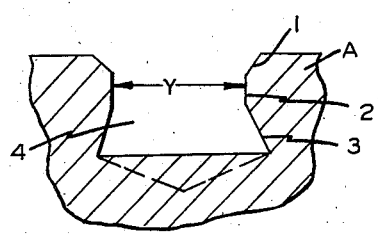

Figure 8 illustrates a recess designed to effect the concept of the invention as applied to an open recess, rather than a blind recess as was the case in Figures 4 and 7. In this case, the recess may be formed with a parallel hole, and both ends enlarged as at 13 and 14 in Figure 8.

Thus when here and elsewhere in this specification and claims I use the term "inner chamber" it is to be understood that if the recess is blind, this chamber will be interiorly formed in the female member as an enlargement of the inner extremity of the parallel portion, while if the recess is the conventional open at both ends, this inner chamber is an enlargement of the extremity of the parallel portion form on the opposite end thereof to the end into which the male member will be inserted.

The male element B will be of the same cross sectional configuration as the parallel portion of the recess, which, for ease of description, it will be assumed is circular, although it will be appreciated that the invention is not limited to a male member and recess of circular section but may be of any desired configuration.

The male member may, for the purposes of explanation, be a solid or hollow cylindrical member as shown in Figures 9 and 10, and it will have an outside diameter Z which is greater than the diameter Y of the parallel portion of the recesses.

The relationship between diameter Z and diameter Y is an important feature according to this invention, and two possibilities exist herein.

In the first possibility, the diameter Z of the male member is such that when part B is pressed into part A, neither part is stressed beyond its elastic limit.

According to this condition, part B is guided into the parallel recess of part A by the outwardly flared portion which is preferably provided in the recess. As part B is press fitted into this parallel recess, A and B both strain within their elastic limits until the bottom of part B reaches the bottom of the parallel; i.e. the beginning of the enlarging tapered chamber. Until the part B reaches this point, the parts are joined in a conventional press fit, the degree of frictional engagement being dependent upon the expansion of the recess and contraction of part B. As part B is increasingly forced into part A below the parallel portion thereof, the resilience of part A permits it to expand to its original size forming a positive lock in the lower portion of the tapered chamber as may be seen in Figure 11.

A second possibility exists with respect to these parts however, namely when A and B are of such size and construction, B or A, or both, are stressed beyond the elastic limit of either or both.

According to this embodiment, the parts are joined in the manner as described above but different results follow. When part B is of substantially greater size and weaker construction than the parallel of part A the outward taper of the latter, in addition to serving as a guide serves as a die to reduce substantially the size of part B, straining part B beyond its elastic limit. The initial resiliency of part B is destroyed and that portion entering the parallel of part A develops new properties including new resilience. As part B passes into the bottom enlargement of the recess, its newly acquired resilience permits it to expand to a size ZZ which although less than Z is nevertheless sufficient to form a lock with the upper portion of the tapered chamber whether or not the chamber itself has been stressed beyond its own elastic limit. This relationship may be seen by reference to Figure 12.

Similarly when the same difference in size exists but A is of weaker construction than B, A will expand substantially losing its initial resilience and maintain frictional engagement with B through its newly acquired resilience.

Also similarly when both are of equal strength, B will be reduced and A will be expanded but frictional engagement will be maintained by the newly acquired resilience of both.

As has been pointed out, the efficiency of the conventional press fit varies with the interference between the two parts while the instant invention provides a positive lock between two parts which automatically compensates for minor variations in size or composition of either element.

For example, if part B is of steel and of ¾ inch size, it may be press fitted by conventional methods into a socket with an interference of about .0012", but according to this invention, interference even above .003" may be employed, the precise figure, of course, depending upon the design, size and properties of both the male and female members.

A further embodiment of the invention is illustrated in Figures 13 and 14. Where it may be desired to increase the lock, a tapered slug C may be inserted base down into the recess of part A as shown. Part B according to this embodiment is hollow (as shown in Figure 13) or otherwise shaped to accept part C as shown in Figure 14. According to this embodiment, the natural expansion of part B into the tapered chamber is extended by the action of the slug C which will expand the sides of B to engage the walls of the tapered chamber throughout their length thus creating greater frictional engagement and an even more positive lock between the parts.

The slug, if desired, may be made sufficiently long to extend beyond the lip of the recess and thus, when assembled, a distance interiorly into part B, if of hollow construction, prior to its entry into the recess. Such an embodiment would reinforce the interior of part B and render it less subject to fracture upon the application of a stress between the parts.

If desired, the relationship between the parts may be ensured by the use of a pin D passing into or through parts A and B or parts A, B and C.

Specific examples of the application of the invention have been given with reference to the drawings. For ease of description, the recesses and male members have all been shown as circular in cross section, and the dimensions X, Y and Z, therefore, as diameters. It will be appreciated however that the invention is in no way to be construed as limited to circular cross sections. If square, rectangular, oval or any other shape of recess is required, the male member will be designed and proportioned to provide a press fit therein and the same consideration as to the degree of stress of the female member and of any portion of the male member functionally engaging the female member will apply. Similarly the invention has been described with reference to a flared outer portion at the entrance of the recess, only the intermediate portion of the recess being parallel. While this flared configuration is to be preferred the recess could be parallel from its outermost extremity to the inner chamber and the part B initially crimped or otherwise formed into this recess without the necessity of the flared portion.

This initially flared portion however, is prepared since it affords several notable advantages to the practice of the invention namely:

(a) The taper tends to avoid deleterious deformation of the parts when both parts are stressed below their elastic limits;

(b) The taper serves as a die when either or both parts are stressed beyond their elastic limits to control deformation;

(c) When the male member is subjected to bending where it extends beyond the female member, this bending is resisted by a substantial portion of the area of the taper above the parallel portion of the recess rather than a line as in conventional press fits. This area, moreover, serves to dampen vibrations when the bending alternates rapidly.

Since the effectiveness of the tapered portion in at least (c) above depends upon the area of the male member contacting it, it will be seen that this effectiveness increases as the included angle of the tapered portion decreases. In practice included tapers of more than 30° will rarely be required, and included tapers as low at 1° could be employed, the lower limit of course, depending upon the relative dimensions of the pieces and the practical effectiveness of the taper as a guide. This further distinguishes the invention from conventional press fits where an outer included taper of 118° is common and rarely less than 60° is encountered.

It will be understood that while this initial portion has been described as a taper of small included angle, it may be of any other convenient form such as the section of a circle or a parabola.

The invention has been described, moreover, with reference to an intermediate "parallel portion." Since the essence of the invention lies in the provision of (*a*) an inner chamber of greater dimensions than the minimum dimensions of the recess, with or without (*b*) an initially flared portion, it is to be understood that the relative length of this parallel portion may vary down to the extreme case shown in Figure 16, in which, for all practical purposes, there is no parallel portion. Such a construction, however would not be especially applicable to the formation of the inner chamber by means of the eccentric tool as already discussed since the lack of extended parallel portion would offer little support to that portion of the tool immediately above the inner chamber to be formed.

Again the inner chamber has been described as "tapered" outwardly. This is the preferred form because of the facility with which a tapered inner chamber may be provided even in a blind recess by the use of an eccentric tool as described. In order to effect the concept of the invention, however, it is not essential that this chamber have a tapered section—if any other configuration can be provided or is required for any reason whatever, it is only necessary according to the invention that the inner chamber be larger than the parallel cross section to provide a space into which the part B may expand following insertion past the parallel portion of the recess.

Other constructional and functional details have been given, but it is to be noted that these are merely included to illustrate and not to limit the invention. Such embodiments of the invention as come within the scope and purview of the appended claims are to be considered as part of this invention.

What I claim as my invention is:

1. A male and a female member adapted to be frictionally retained together, said female member having a recess with an initial inwardly tapered portion, an intermediate parallel portion and an inner chamber; said male member being designed with sufficiently greater cross-sectional dimensions than the parallel portion of said recess, so that the male member is stressed substantially beyond its elastic limit upon insertion into the recess; said initial inward taper being adapted to act as a die to guide the male member and compress it into the parallel portion without deleterious deformation, said inward taper having an included angle of at least 1° but less than 30° and insufficient to cause shaving of the male member; said inner chamber having sufficiently greater cross-sectional dimensions than the parallel portion of the recess to permit the inner end of the male member to expand freely thereinto.

2. A hollow male member and a female member adapted to be frictionally retained together, said female member having a recess with an initial inwardly tapered portion, an intermediate parallel portion and an inner chamber; said male member being designed with sufficiently greater cross-sectional dimensions than the parallel portion of said recess so that the male member is stressed substantially beyond its elastic limit upon insertion into the recess; said initial inward taper being adapted to act as a die to guide the male member and compress it into the parallel portion without deleterious deformation, said inward taper having an included angle of at least 1° but less than 30° and insufficient to cause shaving of the male member; said inner chamber having sufficiently greater cross-sectional dimensions than the parallel portion of the recess to permit the male member to re-expand thereinto, a slug having a tapered base and a top of lesser cross-sectional dimension than the base inserted into said inner chamber, base down, the base of the slug being of lesser cross-sectional dimensions than those of the innermost extremity of said chamber, but of greater cross-sectional dimensions than those of the inside of the hollow member and of the parallel portion of the recess, the top of the slug being of lesser cross-sectional dimension than the inside of the hollow member whereby the walls of said hollow member are forceably expanded into said inner chamber upon insertion of the male member past the parallel portion of the recess and onto the slug, and a pin passing through the walls of the female member the male member and the slug, adapted to preserve the relationship of the female member, slug and male member.

References Cited in the file of this patent
UNITED STATES PATENTS

| | | |
|---|---|---|
| 751,902 | Dodge | Feb. 9, 1904 |
| 886,515 | Jude | May 5, 1908 |
| 1,693,848 | Kyle | Dec. 4, 1928 |
| 1,946,065 | Dodge | Feb. 6, 1934 |
| 1,947,839 | Fissue | Feb. 20, 1934 |
| 2,013,411 | Hummel | Sept. 3, 1935 |
| 2,095,885 | Moreira et al. | Oct. 12, 1937 |
| 2,374,270 | Brock | Apr. 24, 1945 |
| 2,415,232 | Brock | Feb. 4, 1947 |
| 2,544,109 | Richardson | Mar. 6, 1951 |